(12) United States Patent
Yin

(10) Patent No.: US 6,880,289 B1
(45) Date of Patent: Apr. 19, 2005

(54) LINE CONNECTOR

(76) Inventor: Way Yin, 1005 Lone Tree Ct., Bellingham, WA (US) 98229

( * ) Notice: Subject to any disclaimer, the term of this patent is extended or adjusted under 35 U.S.C. 154(b) by 46 days.

(21) Appl. No.: 10/709,482

(22) Filed: May 8, 2004

(51) Int. Cl.[7] ............................................. A01K 91/03
(52) U.S. Cl. ..................................... 43/44.98; 403/353
(58) Field of Search ........................... 43/44.98, 42.49, 43/44.83; 24/908; 403/353, 298

(56) References Cited

U.S. PATENT DOCUMENTS

| 1,694,051 | A | * | 12/1928 | Bardon | ........................ 403/353 |
| 1,982,183 | A | * | 11/1934 | Tarbox | ........................ 403/331 |
| 3,722,130 | A |   | 3/1973  | Handl  | ........................ 43/44.98 |
| 3,898,760 | A | * | 8/1975  | Klein  | ........................ 43/44.83 |
| 3,988,852 | A | * | 11/1976 | Klein  | ........................ 43/44.83 |
| 4,117,574 | A |   | 10/1978 | Yoshida| ........................ 24/129 R |
| 4,141,116 | A | * | 2/1979  | Zalonis| ........................ 24/375 |
| 4,177,598 | A | * | 12/1979 | Jolley | ........................ 43/42.49 |
| 4,210,984 | A | * | 7/1980  | Koenig | ........................ 24/697.2 |
| 4,604,821 | A |   | 8/1986  | Moser  | ........................ 43/44.98 |
| 4,864,767 | A |   | 9/1989  | Drosdak| ........................ 43/43.1 |
| 5,188,539 | A | * | 2/1993  | Langdon| ........................ 439/341 |
| 5,469,652 | A |   | 11/1995 | Drosdak| ........................ 43/44.83 |
| 2002/0108294 | A1 |   | 8/2002  | Denby  | ........................ 43/43.12 |

* cited by examiner

Primary Examiner—Teri P. Luu
Assistant Examiner—Susan C. Alimenti
(74) Attorney, Agent, or Firm—Bruce E Harang

(57) ABSTRACT

Disclosed is an apparatus for the knotless connecting and disconnecting of sections of fly line or fly line and leader line comprising complimentary female and male interlocking portions. Each portion permanently attached in the core of different sections of fly lines or leader lines.

18 Claims, 4 Drawing Sheets

LINE CONNECTOR

BACKGROUND OF INVENTION

1. Field of the Invention

The present invention generally relates to angling accessories and particularly to connectors for connecting sections of fishing lines together in a non-permanent manner thereby allowing the changing of fishing line sections without the need for re-tying, or replacing a connector.

More particularly the present invention relates to the connection of sections of fly-fishing line used for the sport of fly-fishing, specifically to the interchangeable use of various sections of fly line of differing densities comprising the terminal section of the fly line proximal to the leader line, as well as connecting leader line to fly line, without the need for knots or loop to loop connections.

2. Description of the Related Art

In the sport of fly-fishing, the lure, or fly, is of light weight, and by itself, is insufficiently heavy to load, or bend the rod to a sufficient degree to allow it to cast the line, or throw the line by the recoil of the rod as it unloads, or unbends. A fly line is thus used to provide the weight to load, or bend the rod, and the relatively lightweight fly is attached to the fly line by a length of tapered monofilament line (the leader) and is carried along during the cast by the weight of the fly line.

Fly lines are typically composed of a core, which may be a single continuous strand of monofilament, or may consist of a continuous section of tubular braided multifilament material, for example, nylon or Dacron. The core material is selected to perform optimally in the target arena in which the fly line will be used, and comprises the primary strength component of the fly line in resistance to break-age. In turn, the core is coated with a plastic material such as, for example, polyurethane, and polyvinylchloride, in various proprietary formulations and manufacturing processes. This coating of plastic is used to provide a precise distribution of mass along the fly line optimized for various fly-fishing situations.

In an unaltered state, the plastic coatings have a specific gravity of near 1.000. In the manufacture of fly lines, various substances may be included into the molten plastic coating material to alter the floating or sinking characteristics of a fly line. For increasing the floatation of a fly line, for example, microscopic hollow glass beads are commonly used, and to increase the sinking characteristics of a fly line, solid glass beads or powdered tungsten are commonly used.

In certain fly fishing situations it is advantageous to be able to vary the density of the end or tip section of the fly line that is connected to the leader line. Typically, the original tip section of a floating fly line, usually measuring between ten and twenty-five feet in length, is removed from the body of the fly line, and various substitute sections of fly line of comparable weight and length to the removed section, but consisting of greater densities are connected to the body of the fly line. Using tips of differing densities allows the delivery of the fly to fish that are feeding below the surface. The denser the fly line tip sections the greater depth that the fly reaches.

As the optimal tip density may vary through the course of a fishing day, the capability to rapidly exchange tips of varying density is often advantageous to the fly fisherman. The tips are typically connected to the body of the fly line with an interlocking loop to loop connection. Some commercially manufactured fly lines have loop to loop connections preconfigured, but the durability of manufactured loop to loop connections has not proven to be as durable as "after market" loops connected to the ends of the fly line and fly line tips and constructed of braided hollow tubular material, such as, for example, monofilament or Kevlar, and add considerable cost to the consumer. These after market connections are typically made by the fly fisher, and consist of forming a loop in the hol-low braided material, or purchasing a preformed braided loop, and passing the cut end of the fly line or tip into the hollow braid. The ends of the braid are secured with an over winding of thread, silicone tubing, or with heat shrink tubing. The braid constricts with elongation, and securely grips the fly line under tension.

Simple, loop to loop connections have an intrinsic disadvantage in that to make an interlocking connection, the entire length of the tip and attached leader line must be drawn through one of the loops. Typically the fly will not fit through the loop and must be removed and reattached. This process is time consuming, as is the construction and placement of after market loop connectors.

Various devices and procedures have been proposed but none produces an easily removable tip section without time-consuming procedures or having simple interchangeability characteristics.

For example, U.S. Pat. No. 3,722,130 issued Mar. 27, 1973 to Handl teaches the permanent connection of the ends of two lengths of tubular fishing line through the use of a barbed pin inserted into the center of one end of each length of fishing line to be permanently connected.

U.S. Pat. No. 4,117,574 issued Oct. 3, 1978 to Yoshida teaches a device for connecting a leader to the end of a fishing line where the fishing line is passed through the center of one end of the device and then wound around the periphery of the device and locked to the device by passing through at least one bore orientated perpendicular to the longitudinal axis of the device. The leader is then tied to the device by passing through a bore located at the end of the device opposite the end through which the fishing line enters and tied off using a knot.

U.S. Pat. No. 4,604,821 issued Aug. 12, 1986 to Moser teaches a hollow core braided connector into the center of which is permanently attached the end of a fly fishing line and at the other end of which a special three strand twisted leader butt is permanently attached to the other end of the connector and glued in place U.S. Pat. No. 4,864,767 issued Sep. 12, 1989 to Drosdak teaches a fly fishing line connector comprising an elongated or cigar-shaped body having a loop connector at one end and a jaw means a the other end. The jaw means grips the fly-fishing line end and a locking means permanently locks the jaws closed thereby holding the end of the fly-fishing line. The jaws are locked using locking pins, screws, or an external clamp.

U.S. Pat. No. 5,469,652 issued Nov. 28, 1995 to Drosdak teaches fly fishing leader having a threaded portion located on the butt end which screws into a complimentary threaded connector permanently mountable on the end of a fly fishing line and into which said threaded leader butt may be mounted.

U.S. Patent Application Publication Number 2002/0108294 published Aug. 15, 2002 to Denby teaches a fishing line connector having a loop on one end for attaching the end of one fishing line and a hollow toothed bore in the other end for permanently attaching the end of a second fly-fishing line.

DISCLOSURE OF THE INVENTION

The present invention provides advantages and alternatives over the prior art by providing a simple and reversible connection of one section of a fly line to another section of fly line, to a tip, or to a leader line, without the requirement of threading the length of the second section of fly line or tip or leader line through one loop of a loop to loop connection, and does not necessitate the removal of the fly from the leader line.

According to a further aspect of the present invention, there is provided a means of connecting the present invention to both hollow core and solid core fly lines.

According to yet another aspect of the present invention there is provided an easy means for a fly fisherman on river or lake to change fly line sections or tip sections easily and speedily, a means that is cost effective to manufacture and easy to install in any desired location along the fly line body.

According to a yet further aspect of the present invention there is provided an apparatus for the knotless connecting and disconnecting of sections of fly fishing lines in cooperative combination comprising: a female component permanently attached to an end of a first fishing line and having an ellipsoidal body having a bore therethrough at an acute angle to the ellipsoidal body longitudinal axis, on end of said bore having a first contoured opening and the other end of said bore having a second contoured opening, a fusiform line mounting stem portion on the longitudinal axis on one end of said ellipsoidal body, and a channel on the longitudinal axis of said ellipsoidal body connecting one contoured opening to the other end of said ellipsoidal body; and a male component permanently attached to an end of a second fishing line and having an ellipsoidal body dimensioned to fit within said bore in said female component and having a fusiform stem portion on the longitudinal axis at one end of said ellipsoidal body, said fusiform stem comprising a channel mating section proximal to said ellipsoidal body and a line mounting portion distal to said ellipsoidal body; thereby allowing the connection to, and disconnection from, said fly fishing lines with one another.

According to still another aspect of the present invention there is provided an apparatus for the knotless connecting and disconnecting of sections of fly fishing lines in cooperative combination comprising: a female component permanently attached to an end of a first fishing line and having an ellipsoidal body having a bore therethrough at an acute angle to the ellipsoidal body longitudinal axis, on end of said bore having a first contoured opening and the other end of said bore having a second contoured opening, a fusiform line mounting stem portion on the longitudinal axis on one end of said ellipsoidal body said fusiform line mounting stem having a plurality of retaining nodes thereon, and a channel on the longitudinal axis of said ellipsoidal body connecting one contoured opening to the other end of said ellipsoidal body; and a male component permanently attached to an end of a second fish-ing line and having an ellipsoidal body dimensioned to fit within said bore in said female component and having a fusiform stem portion on the longitudinal axis at one end of said ellipsoidal body, said fusiform stem comprising a channel mating section proximal to said ellipsoidal body and a line mounting portion distal to said ellipsoidal body and said fusiform line mounting stem distal portion having a plurality of retaining nodes thereon; thereby allowing the connection to, and disconnection from, said fly fishing lines with one another.

The present invention thus advantageously provides a device for allowing the quick, simple, and secure changing of fly line sections or tips during fishing for both hollow braided core and solid core fly lines.

DETAILED DESCRIPTION

Figure 1:
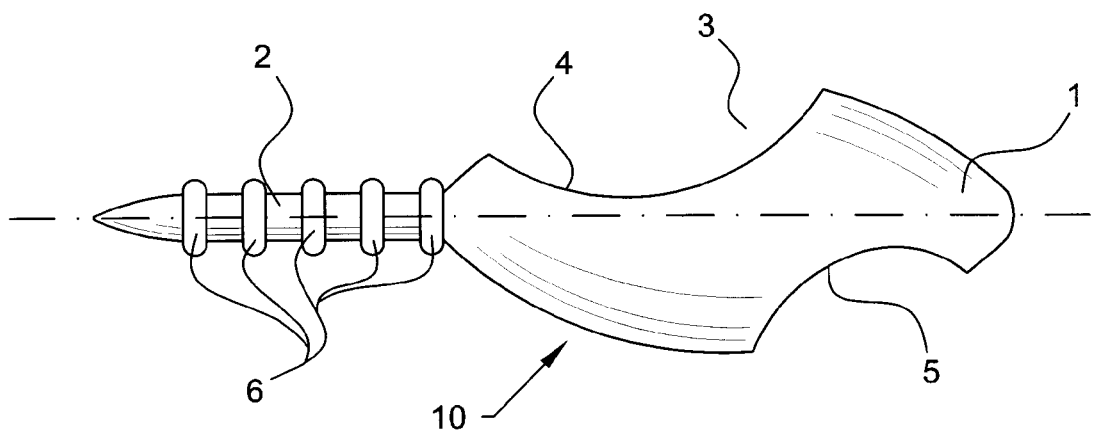
FIG. 1 shows a side view of one embodiment of the female body component of the present invention.

Reference will now be made to the drawings, wherein to the extent possible like reference numerals are utilized to designate like components throughout the various views. Referring to FIG. 1, which presents a side view of a preferred embodiment of the female component 10 of the present invention comprising a generally ellipsoid body portion 1 and having a bore 3 therethrough positioned at an acute angle to the longitudinal axis of said body and further said openings of said angled bore 3 having a first contoured opening 4 on one end and a second contoured opening 5 on the other end, and a fusiform stem portion 2 located at one end, and along the longitudinal axis of, the body portion 1, and having located thereon a plurality of retaining nodes 6.

Figure 2:
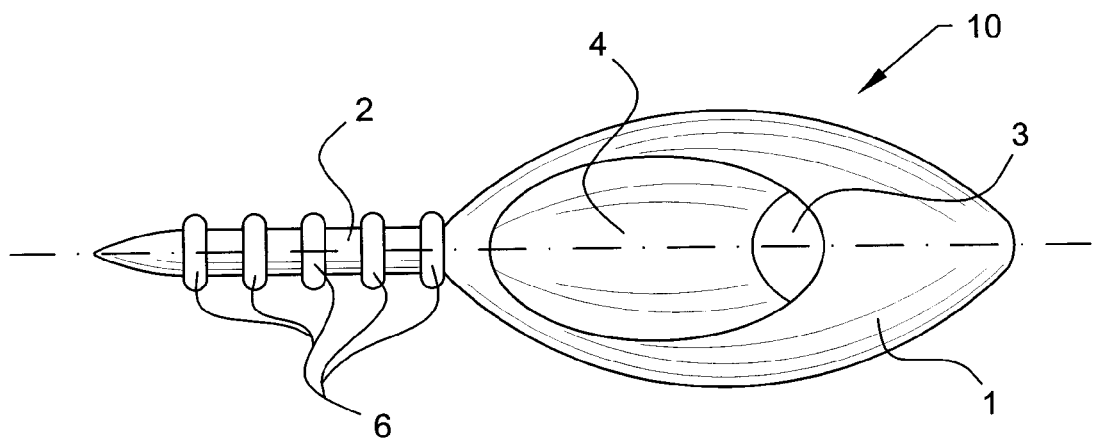
FIG. 2 shows a top view of one embodiment of the female body component of the present invention.

Referring now to FIG. 2, there is shown a top view of the preferred embodiment of the female component 10 of FIG. 1 showing the body 1, the contoured opening 4 at one end of angled bore 3 as well as fusiform stem portion 2 having a plurality of retaining nodes 6 hereon.

Figure 3:
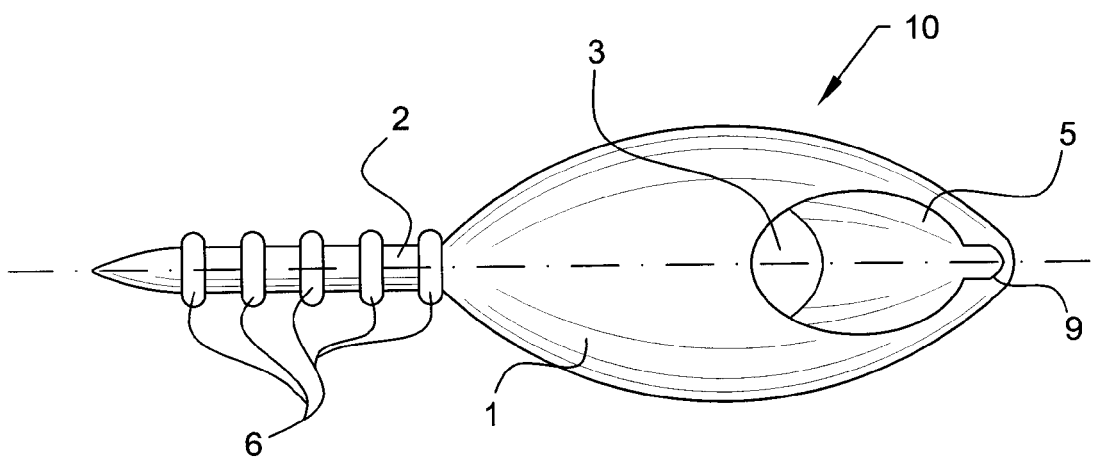
FIG. 3 shows a bottom view of one embodiment of the female body component of the present invention.

Turning now to FIG. 3, there is shown a bottom view of the preferred embodiment of the female component 10 of FIG. 1 showing the body 1, the contoured opening 5 having extending therefrom to the end of body 1 opposite fusiform fusiform stem 2 a channel 9 for receiving a portion 8 of the fusiform fusiform stem 2 of male component 20 (FIGS. 4, 6, and 9), as well as fusiform fusiform stem 2 having a plurality of retaining nodes 6.

Figure 4:
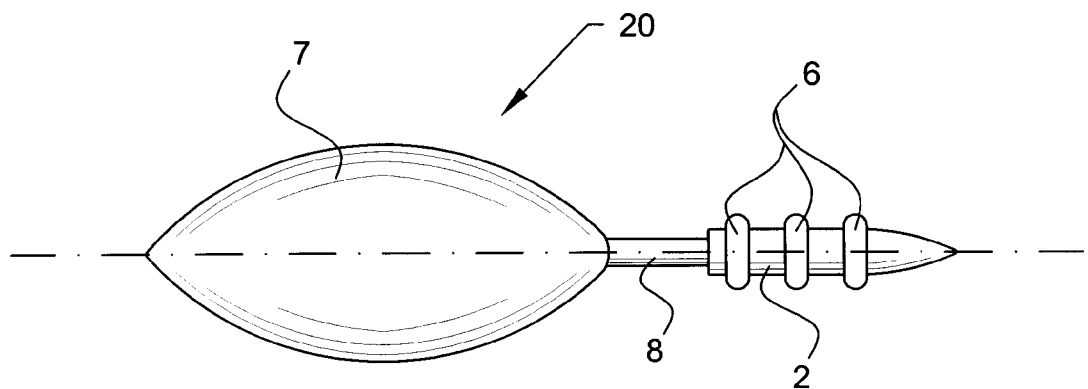
FIG. 4 show a view of one embodiment of the male body component of the present invention.

In FIG. 4 is shown a view of the male component 20 of the present invention comprising a generally ellipsoid body 7 having located at one end along the longitudinal axis a fusiform fusiform stem 2 having a plurality of retaining nodes 6, and a channel seating section 8 proximal to the body 7.

Figure 5:
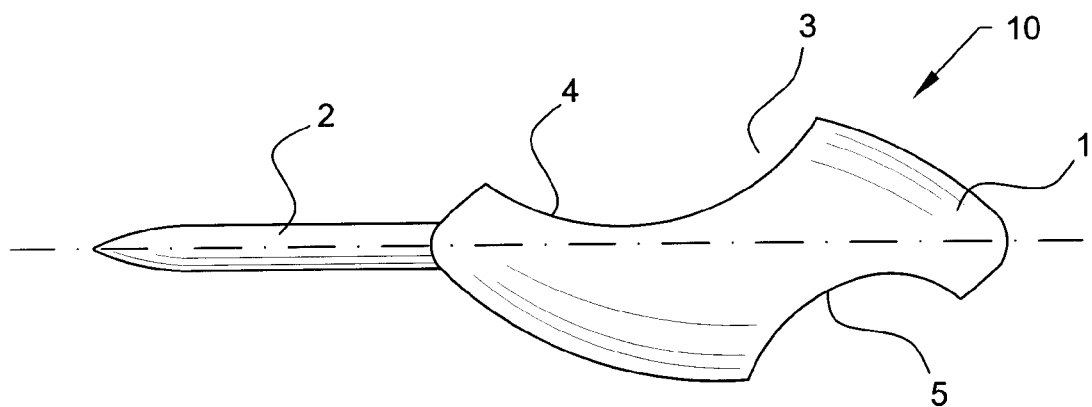
FIG. 5 shows a side view of another embodiment of the female body component of the present invention.

In FIG. 5 is shown a view of another preferred embodiment of the female component 10 of the present invention having a generally ellipsoid body 1 comprising a generally ellipsoid body portion 1 and having a bore 3 therethrough positioned at an acute angle to the longitudinal axis of said body and further said openings of said angled bore 3 having a first contoured opening 4 on one end and a second contoured opening 5 on the other end, and a substantially smooth surfaced fusiform stem portion 2 located at one end, and along the longitudinal axis of, the body portion 1.

Figure 6:
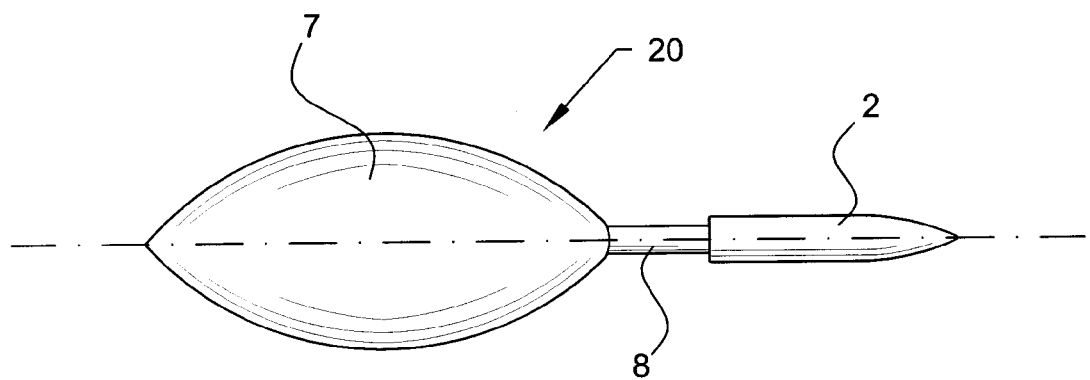
FIG. 6 shows a view of another embodiment of the male body component of the present invention.

In FIG. 6 is shown a view of another preferred embodiment of the male component 20 of the present invention comprising a generally ellipsoid body 7 having located at one end along the longitudinal axis a fusiform stem 2 having a substantially smooth surface, and a channel seating section 8 proximal to the body 7.

Figure 7A:
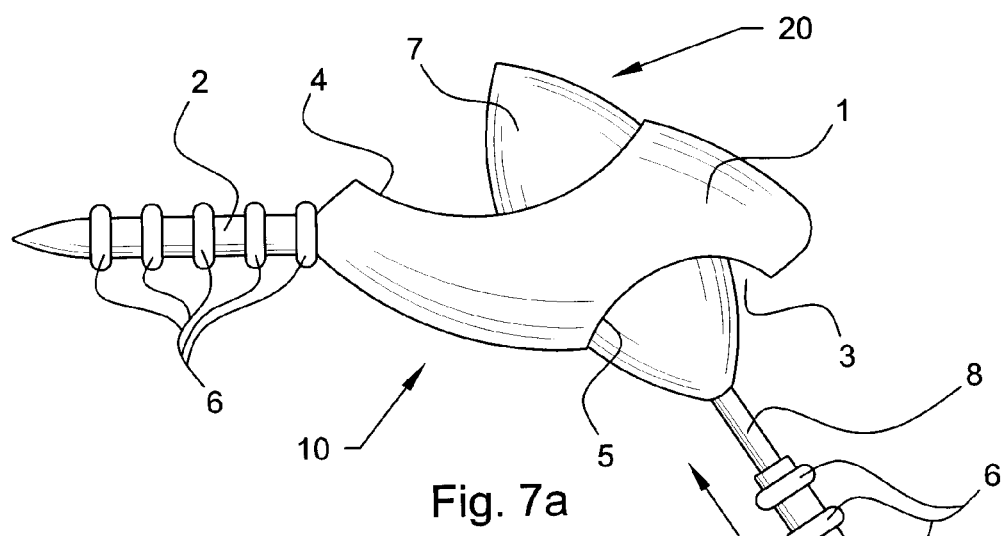
FIGS. 7a, 7b, and 7c show the male body component of present being mounted in the female body component of the present invention.
Figure 7B:
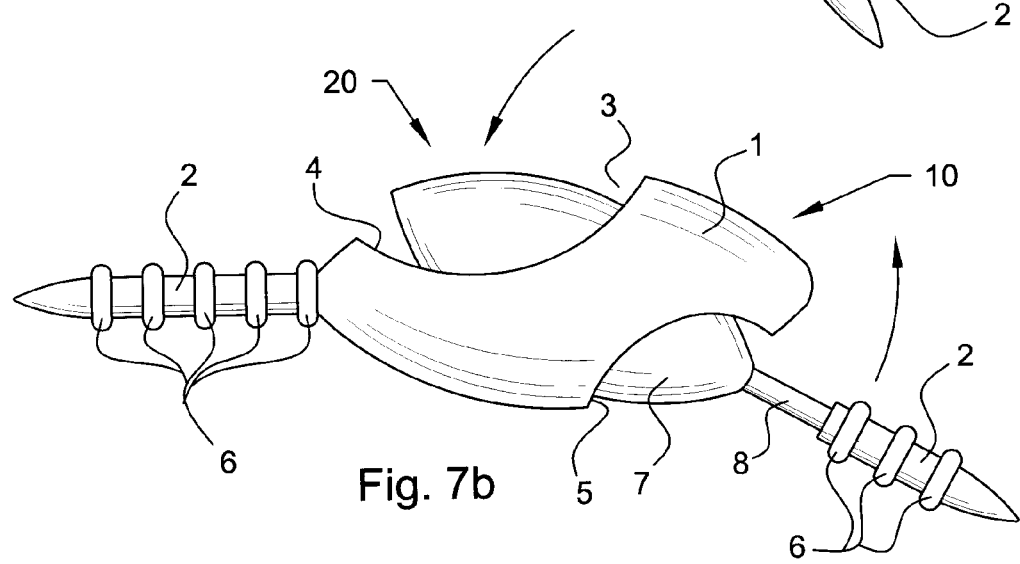
Figure 7C:
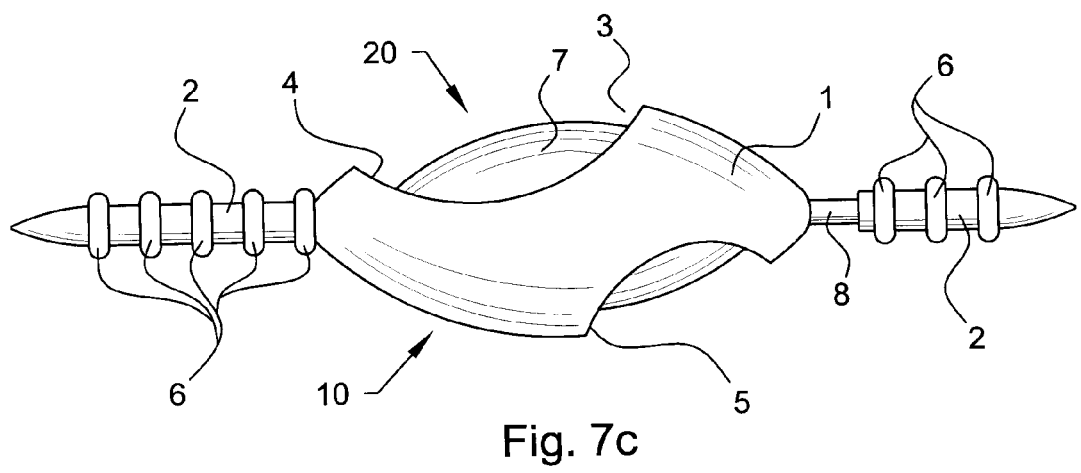

FIGS. 7a, 7b, and 7c illustrate the coupling or uncoupling of the male and female portions of the present invention. In FIG. 7a the body 7 of male component 20 is inserted into bore 3 of body 1 of female component 10 through contoured opening 5, the longitudinal axis of the two components being at some desired acute angle to one another and the male portion 20 body 7 is a desired distance into the bore 3 and partially extending through contoured opening 4. FIG. 7b shows the male component 20 being rotated within the female portion 10 bore 3 to bring the longitudinal axis of both components into alignment. FIG. 7c shows the male component 20 with stem portion 8 seated within channel 9 (FIG. 3) ready for use. The fly line sections connected to each fusiform stem portion 2 have been omitted for clarity in these FIGS. 7a, 7b and 7c.

Figure 8:
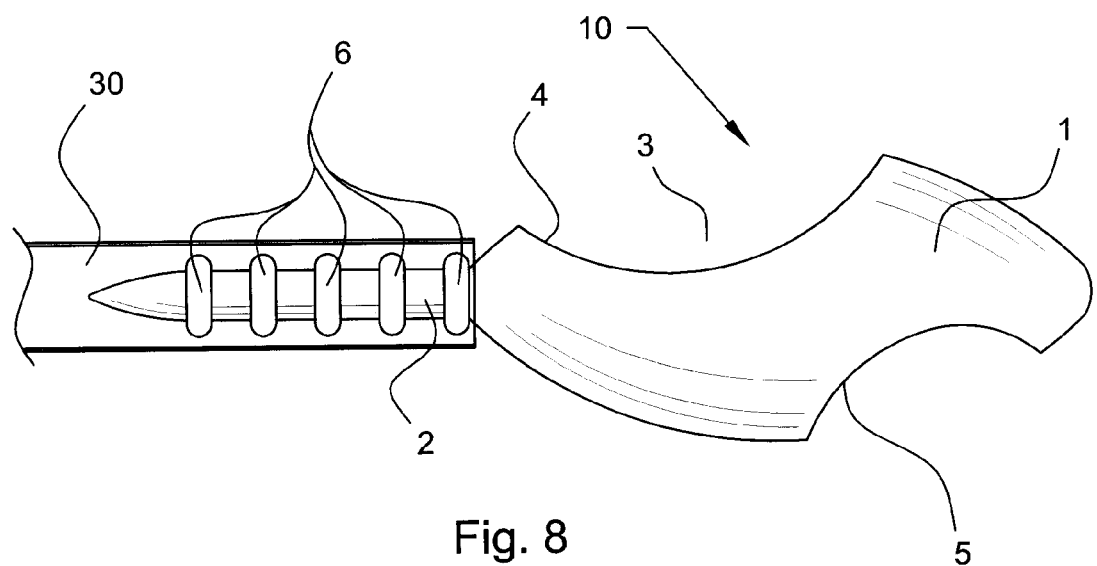
FIG. 8 shows one embodiment of the female body component of the present invention mounted in the end of a fly line.

In FIG. 8 there is shown a female component 10 of the present invention comprising a body 1 having a bore 3 therethrough at an acute angle and said bore 3 having contoured opening 4 and one end and a contoured opening 5 at the other end, and a fusiform stem 2 having a plurality of retaining nodes 6 mounted in a partial section of a fly line 30.

Figure 9:
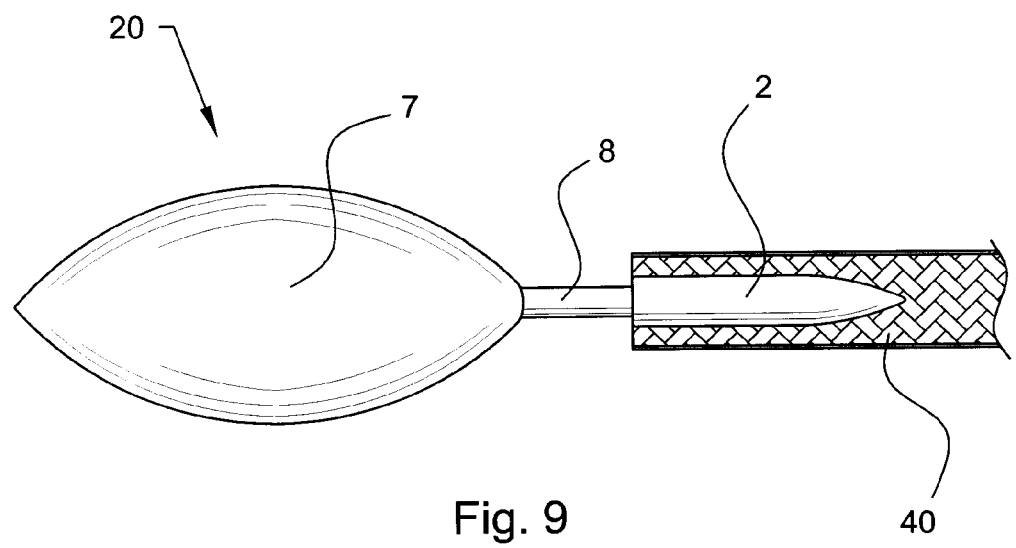
FIG. 9 shows one embodiment of the male body component of the present invention mounted in the end of a fly line.

In FIG. 9 there is shown a male component 20 of the present invention comprising a body 7 and a substantially smooth surface fusiform stem 2 having a channel mounting section 8 proximal to said body 7 with said fusiform stem 2 mounted in a partial section of a braided tubing such that channel mounting section 8 remains clear of said braided tubing. It is to be understood that the use of a braided hollow core section of line provides a connection between the present invention and the end of a line section by way of a "Chinese finger cuff" type arrange-ment. It is also to be understood that this braided hollow core connection can be strengthened, if desired, by using a well-known fishing knot such as, for example, a nail knot over the connection area.

It is to be understood that the retaining nodes 6 of the present invention may be in the form of ring-like structures encircling the fusiform stem 2, or may be in the form of threads, may be in the form of knurling, or may be in the form of barbs.

The components 10 and 20 preferably comprise a plastic and most preferably comprise a flexible plastic having flexibility suitable for use with plastic coated fly lines without producing a loss of energy transfer or "hinging" during casting of the fly line. These plastics are well known in the art and need no further explanation to those skilled in the art.

In practice the invention provides for a fly-fishing line connector comprising an ellipsoid female body component having two ends, one end having located thereon a ribbed mounting stem, on the other end a channel for accepting the ribbed mounting stem of a complimentary ellipsoidal shaped male body component and further located therein an opening through said component at an acute angle to the longitudinal axis of the female body configured to accept said complimentary ellipsoidal shaped male body component in a non-permanent manner. The ribbed mounting stems of each body component are permanently mounted in the end of a section of fly line by being forced into the hollow core of the fly line.

Alternatively, in practice the invention provides for a fly-fishing line connector comprising an ellipsoid female body component having two ends, one end having located thereon a mounting stem, on the other end a channel for accepting the mounting stem of a complimentary ellipsoidal shaped male body component and further located therein an opening through said component at an acute angle to the longitudinal axis of the female body configured to accept said complimentary ellipsoidal shaped male body component in a non-permanent manner. The substantially smooth mounting stems of each body component are permanently mounted in the end of a section of fly line by being forced into the hollow core of the fly line or the hollow open core of a braided line positioned over the fly line and over the fusiform end of the connector of the present invention. This connection can be rein-forced using a whip finish knot or a nail knot for example over the connection area.

It is to be understood that the permanent connection of the stems to the fly line or braided line may be enhanced or strengthened by the use of known adhesives, over placement of silicone rubber tubing, and application of securing wraps or knots using a fine thread or line.

Although the preferred embodiments of the present invention has been disclosed, various changes and modifications may be made without departing from the scope of the invention as set forth in the appended claims.

What is claimed is:

1. Apparatus for the knotless connecting and disconnecting of sections of fly fishing lines in cooperative combination comprising:

a female component permanently attached to an end of a first fishing line and having a first ellipsoidal body having a bore therethrough at an acute angle to the first ellipsoidal body longitudinal axis, one end of said bore having a first contoured opening and the other end of said bore having a second contoured opening, a fusiform line mounting stem portion on the longitudinal axis on one end of said first ellipsoidal body, and a channel on the longitudinal axis of said first ellipsoidal body connecting one contoured opening to the other end of said first ellipsoidal body; and a male component permanently attached to an end of a second fishing line and having a second ellipsoidal body dimensioned to fit within said bore in said female component and having a fusiform stem portion on the longitudinal axis at one end of said second ellipsoidal body, said fusiform stem comprising a channel mating section proximal to said second ellipsoidal body and a line mounting portion distal to said second ellipsoidal body; thereby allowing the connection to, and disconnection from said fly fishing lines with one another.

2. The apparatus as claimed in claim 1 wherein, said apparatus is formed of molded plastic.

3. The apparatus as claimed in claim 2 wherein, said apparatus is formed of a molded flexible plastic.

4. The apparatus as claimed in claim 3 wherein, said apparatus has flexibility similar to that of fly-fishing line.

5. The apparatus as claimed in claim 1 wherein, said fusiform stems are permanently mounted in the core of the end of fly-fishing line by means of a permanent adhesive.

6. The apparatus as claimed in claim 1 wherein, said fusiform stems are permanently mounted in the core of the end of fly-fishing line by means of wraps of a fine thread or cord.

7. The apparatus as claimed in claim 1 wherein, said fusiform stems are permanently mounted in the core of the end of fly-fishing line by means of braided hollow core line.

8. The apparatus as claimed in claim 1 wherein, said joined apparatus is made more secure by covering said joined apparatus with a piece of thin flexible tubing.

9. The apparatus as claimed in claim 1 wherein, said female and male components are dimensioned such that when they are joined they snap into a seated locked position.

10. Apparatus for the knotless connecting and disconnecting of sections of fly fishing lines in cooperative combination comprising:
   a female component permanently attached to an end of a first fishing line and having first ellipsoidal body having a bore therethrough at an acute angle to the first ellipsoidal body longitudinal axis, one end of said bore having a first contoured opening and the other end of said bore having a second contoured opening, a fusiform line mounting stem portion on the longitudinal axis on one end of said first ellipsoidal body said fusiform line mounting stem having a plurality of retaining nodes thereon, and a channel on the longitudinal axis of said first ellipsoidal body connecting one contoured opening to the other end of said first ellipsoidal body; and
   a male component permanently attached to an end of a second fishing line and having second ellipsoidal body dimensioned to fit within said bore in said female component and having a fusiform stem portion on the longitudinal axis at one end of said second ellipsoidal body, said fusiform stem comprising a channel mating section proximal to said second ellipsoidal body and a line mounting portion distal to said second ellipsoidal body and said fusiform line mounting stem distal portion having a plurality of retaining nodes thereon; thereby allowing the connection to, and disconnection from, said fly fishing lines with one another.

11. The apparatus as claimed in claim 10 wherein, said apparatus is formed of molded plastic.

12. The apparatus as claimed in claim 11 wherein, said apparatus is formed of a molded flexible plastic.

13. The apparatus as claimed in claim 12 wherein, said apparatus has flexibility similar to that of fly-fishing line.

14. The apparatus as claimed in claim 10 wherein, said fusiform stems are permanently mounted in the core of the end of fly-fishing line by means of a permanent adhesive.

15. The apparatus as claimed in claim 10 wherein, said fusiform stems are permanently mounted in the core of the end of fly-fishing line by means of wraps of a fine thread or cord.

16. The apparatus as claimed in claim 10 wherein, said fusiform stems are permanently mounted in the core of the end of fly-fishing line by means of braided hollow core line.

17. The apparatus as claimed in claim 10 wherein, said joined apparatus is made more secure by covering said joined apparatus with a piece of thin flexible tubing.

18. The apparatus as claimed in claim 10 wherein, said female and male components are dimensioned such that when they are joined they snap into a seated locked position.

* * * * *